United States Patent [19]

Sams

[11] Patent Number: 4,570,986
[45] Date of Patent: Feb. 18, 1986

[54] COMBINED PICKUP BUMPER AND TOOL BOX

[76] Inventor: Jimmie L. Sams, 3097 Stony Way, Marysville, Calif. 95901

[21] Appl. No.: 677,744

[22] Filed: Dec. 3, 1984

[51] Int. Cl.⁴ ............................................. B60R 19/02
[52] U.S. Cl. ............................. 293/117; 224/42.03 A
[58] Field of Search ................. 293/117; 224/42.03 R, 224/42.04, 42.03 A; 312/298, 198, 201, 123

[56] References Cited

U.S. PATENT DOCUMENTS

| | | | |
|---|---|---|---|
| 3,471,070 | 10/1969 | Olson | 224/42.04 |
| 3,501,170 | 3/1970 | Valle | 293/117 |
| 3,606,385 | 9/1971 | Johannes | 293/117 |
| 3,614,136 | 10/1971 | Dent | 224/42.04 |
| 3,905,527 | 9/1975 | Chamberlain | 224/42.03 A |
| 4,138,152 | 2/1979 | Prue | 293/117 |

Primary Examiner—Robert R. Song
Attorney, Agent, or Firm—Gerald L. Moore

[57] ABSTRACT

A bumper assembly for a vehicle comprising a front wall member (18) and an attached bottom wall member (21) supporting two vertical pins (23). Two tool boxes (25) each include a well (33) to receive a pin for support on the bottom wall member in a manner to allow each box to be pivoted outward away from the front wall member to allow access to the box interior. A center tool compartment (46) is formed between the tool boxes with a hitch receiver (44) extending therethrough such that the hitch locking pin is positioned in this center compartment. A cover (30) supported on spring loaded hinges (31) allows locking the tool boxes and center compartment.

10 Claims, 4 Drawing Figures

COMBINED PICKUP BUMPER AND TOOL BOX

FIELD OF THE INVENTION

This invention relates to a bumper assembly primarily for attachment to the rear of a pickup and which incorporates a tool box having a lockable lid with sections that can be pivoted away from the vehicle for easy access.

BACKGROUND OF THE INVENTION

This invention relates to a bumper assembly incorporating tool boxes for attachment to vehicles such as pickup trucks. The tool box is incorporated in one of the bumpers, preferably the rear bumper, in a manner to allow for the storage of a jack, chains and other such tools. By such storage, the tools are out of the way yet accessible when needed. Also, heavy tools can be stored in the bumper area to affect the weight distribution in the vehicle thereby providing for better traction if needed. It is the primary purpose of this invention to provide a combination tool box and bumper that makes the tools easily accessible.

SUMMARY OF THE INVENTION

A bumper for an automotive vehicle comprising a front wall member with means for attachment to the vehicle so as to extend vertically across the end of the vehicle in the normal position of a bumper. A bottom wall member is fixed to the bottom edge of the front wall member and extends horizontally away from the vehicle. A pair of elongated box structures or tool boxes having a bottom wall and side and end walls forming an open topped box rests on the bottom wall member. The tool boxes are attached to the bottom wall in a manner to allow pivoting about one end to a position entending normal to the front wall member and away from the vehicle for easy access to each of the box interiors. A cover pivotally attached to the front wall member can be lowered to the horizontal position to cover the open tops of the tool boxes when they are not pivoted outward.

DESCRIPTION OF THE INVENTION

Figure 1:
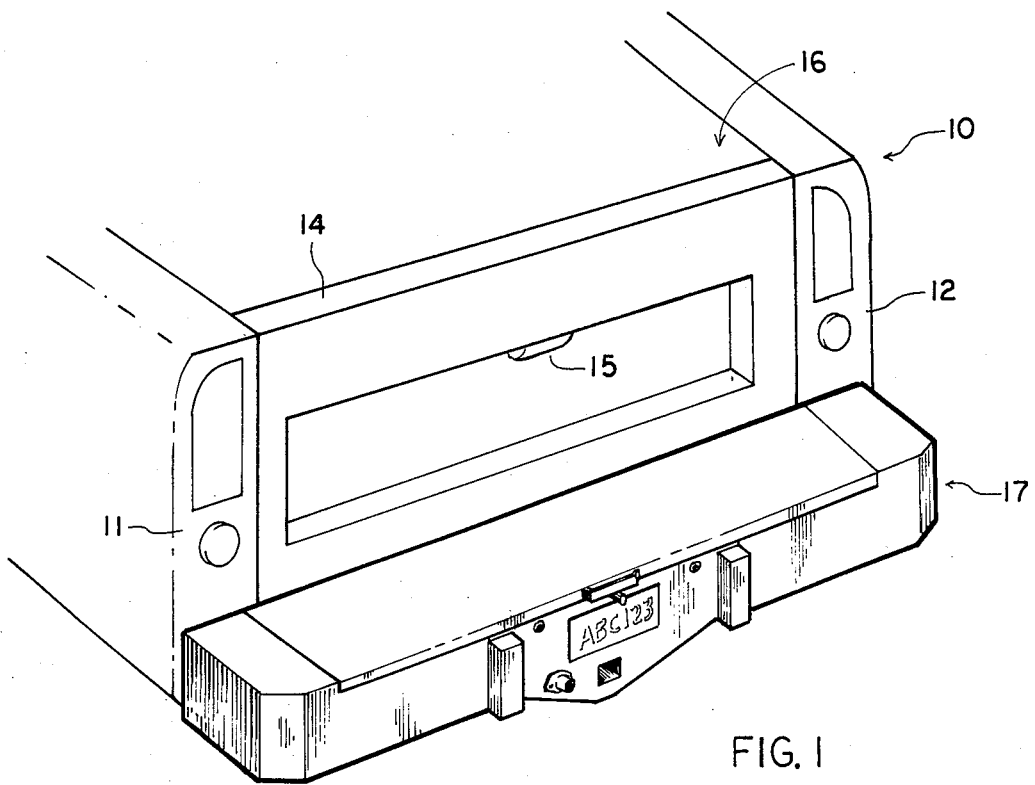
FIG. 1 is a perspective view of the rear portion of a pickup showing an attached bumper assembly incorporating the subject invention.

Shown in FIG. 1 is a portion of the rear of a pick up truck 10 having side panels 11 and 12 and a tailgate 14. By actuation of a handle 15 the tailgate can be swung or pivoted about its bottom edge outward to allow access to the bed 16 of the pickup. The invention is incorporated in the combination bumper and tool compartment 17.

Figure 4:
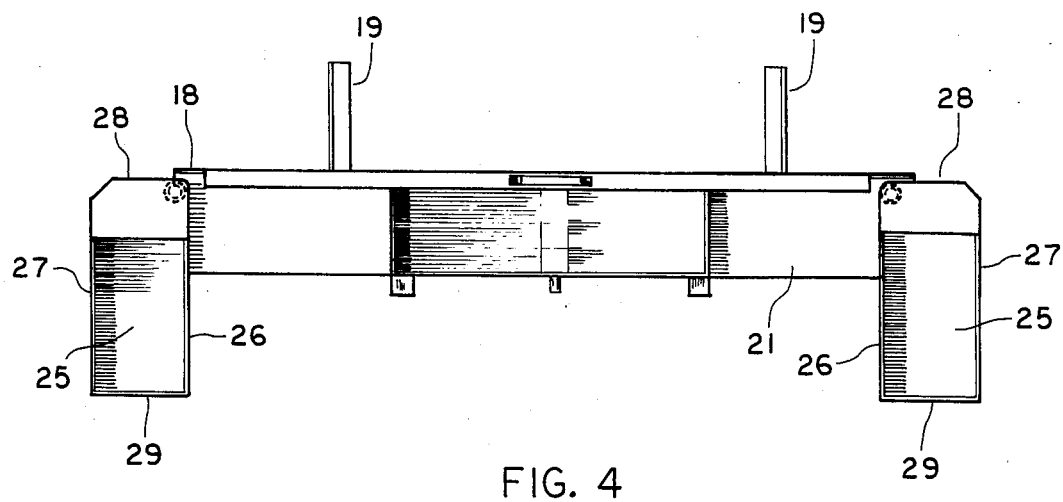
FIG. 4 is a top view of the bumper opened for access to the interior.

Referring also to FIG. 4, the bumper includes a front wall member 18 to which are attached the angle iron supports 19 serving as means for connection to the vehicle frame. These supports are positioned to extend along the pickup frame members (not shown) beneath the vehicle bed and be bolted thereto to serve as means hold the bumper in place. The bottom wall member 21 is attached at the front edge to the front wall member and extends horizontally the width of the vehicle.

A pair of elongated tool boxes 22 and 24 are positioned on the bottom wall member 21 to extend parallel to the front wall member 18 when in the stored position. The tool boxes are mirror images of each other with each including a bottom wall 25, side walls 26 and 27, and end walls 28 and 29. The bottom walls 25 abutt and extend parallel to the bottom wall member.

Figure 2:
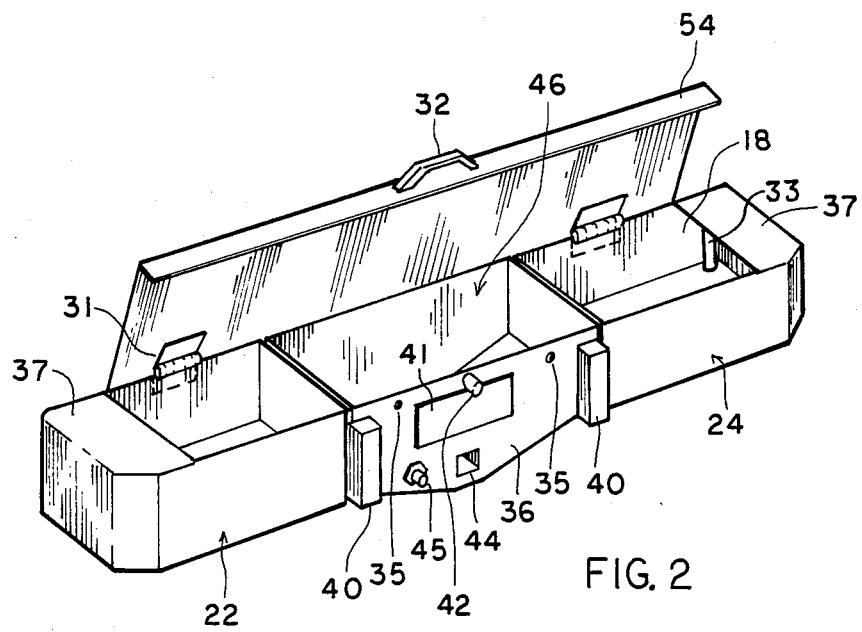
FIG. 2 shows the bumper with the top cover open.
Figure 3:
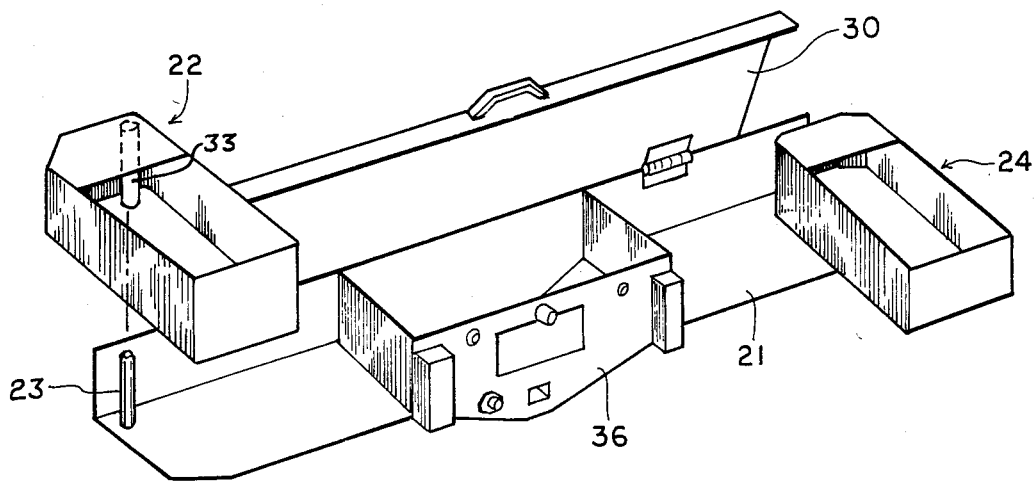
FIG. 3 shows the bumper with the top cover open and one tool box pivoted outward for access to the interior and the other tool box removed from the bumper assembly.

A cover 30 is fixed by hinges 31 to the top edge of the front wall member 18. This cover can be pivoted between a vertical or open position and a horizontal or closed position and will remain in either position because the hinges 31 are spring loaded. A handle 32 is fixed to the extending edge to allow ease of lifting. A front flange 54 extends normal to the cover and overlaps the outer side wall members 27 of the tool boxes when the boxes are in the stored position shown in FIG. 2. Locks 35 in the center rear wall member 36 serve as means to hold the cover in the horizontal or closed position to prevent raising of the cover. When in this position, the tool boxes cannot be swung outward and access to the tool areas is prohibited. A top wall 37 on each of the tool boxes covers that portion not closed by the cover 30.

The center vertical wall member 36 extends between the tool boxes and is fixed rigidly to the extending edge of the bottom wall member 21 to close the tool storage area between the tool boxes. This center wall member serves to support bumper guards 40 and a license plate 41. A light 42 is mounted on the center wall member and a hitch receiver 44 is provided for receiving a trailer hitch of standard design. By incorporating the hitch receiver within a center tool compartment 46, the pin locking mechanism (not shown) holding the hitch in the receiver is inaccessible when the cover is locked thereby safeguarding the hitch against theft. Additionally a connector 45 is provided for electrical connection to a trailer if desired.

Thus there is provided a bumper which with the tool boxes in their stored position appears very similar to other bumpers. The tool boxes are each supported by a pin 23 fixed to the bumper and extending into a well 33 within the box. With the cover 30 raised, each tool box can be swung to the outer position about the pin 23 to allow easy access to the tool compartments contained therein even when the tailgate is lowered. Therefore, if the tailgate is lowered to be used as a work platform, tools in the boxes are still accessible. Also each box structure can be removed by lifting it from the pin 23. The center tool compartment 46 is formed between the tool boxes.

The invention claimed is:

1. A bumper assembly for an automotive vehicle comprising:
   a front vertical wall member having means for attachment to the vehicle,
   a bottom wall member fixed to the bottom of said front wall member and extending horizontally away from the vehicle,
   a pair of elongated box structures having bottom, side and end walls to provide a pair of open topped boxes for holding tools,
   means for attaching each box to the bottom wall member in a position with an elongated side extending along said front wall member, said attaching means allowing each box structure to be pivoted about one end to a position with the elongated sides extending normal to said front wall member to provide easy access to the box structure interiors, and, a cover pivotally attached to said front wall member to normally extend horizontally over and cover said box structures.

2. A bumper assembly as defined in claim 1 including locking means for holding said cover in the horizontal position.

3. A bumper assembly as defined in claim 2 including means to prevent pivoting of said box structures when said cover is in the horizontal position.

4. A bumper assembly as defined in claim 1 wherein said bottom wall member is longer than the total length of said box structures thereby forming a center tool compartment between the box structures and closed by said cover for storage.

5. A bumper assembly as defined in claim 4 including a vertical center wall fixed to extend upward from the extending edge of said bottom wall between said box structures to form said center tool compartment.

6. A bumper assembly as defined in claim 5 including a hitch receiver extending through said center tool compartment with a pin locking mechanism therein.

7. A bumper assembly for an automotive vehicle comprising:

a pair of elongated box structures having bottom, end and elongated side walls forming open topped boxes, an elongated front wall member including means for attachment to the vehicle generally in the location normally occupied by a bumper, means attaching said box structures in end to end relationship to said front wall member such that said box structures normally extend with said elongated side walls parallel to said front wall member and said box structures being pivotable to a position with the elongated side walls extending normal to said front wall member, and a cover extending horizontally over said box structures.

8. A bumper assembly as defined in claim 7 wherein said cover is pivotally attached to said front wall member so as to be movable to a vertical position to uncover said box structures.

9. A bumper assembly as defined in claim 8 wherein a front flange is fixed to said cover to overlap the outer elongated sides of said box structures when said box structures are in the end to end position and said cover is in the horizontal position.

10. A bumper assembly as defined in claim 9 including means to lock said cover in the horizontal position.

* * * * *